United States Patent
Murrell et al.

(10) Patent No.: US 6,350,429 B1
(45) Date of Patent: *Feb. 26, 2002

(54) METHOD FOR MAKING MOLECULAR SIEVES AND NOVEL MOLECULAR SIEVE COMPOSITIONS

(75) Inventors: Lawrence L. Murrell, South Plainfield; Rudolf A. Overbeek, Chatham Township; Yun-feng Chang, Chatham; Nelleke Van Der Puil, Hoboken; Chuen Y. Yeh, Edison, all of NJ (US)

(73) Assignee: ABB Lummus Global Inc., Bloomfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/465,029

(22) Filed: Dec. 16, 1999

Related U.S. Application Data

(63) Continuation of application No. 08/939,271, filed on Sep. 29, 1997, now Pat. No. 6,004,527.

(51) Int. Cl.$^7$ .................... C01B 37/04; C01B 39/02
(52) U.S. Cl. .................. 423/712; 423/716; 423/305; 423/306; 423/328.2; 423/DIG. 21; 423/DIG. 22; 423/DIG. 27; 423/DIG. 30
(58) Field of Search ................ 423/712, 716, 423/DIG. 21, DIG. 22, DIG. 27, DIG. 30, 305, 306, 328.2

(56) References Cited

U.S. PATENT DOCUMENTS 5,514,362 A * 5/1996 Miller .................... 423/702

* cited by examiner

Primary Examiner—David Sample
(74) Attorney, Agent, or Firm—Elliot M. Olstein; Raymond J. Lillie

(57) ABSTRACT

This invention relates to the synthesis of large pore composite molecular sieves and to the synthetic large pore composite molecular sieves so produced. The molecular sieves of the invention have the same general utilities of the comparable molecular sieves of the prior art but have been found to be superior catalysts and absorbents. This invention relates to a hydrothermal synthesis of large pore molecular sieves from nutrients, at least one of which contains an amorphous framework-structure, and which framework-structure is essentially retained in the synthetic molecular sieve. This invention stems from a discovery that the intrinsic porosity characteristics of a nutrient that possesses an amorphous cation oxide-framework can be substantially retained in the final molecular sieve containing product formed by a hydrothermal process by carefully controlling the conditions under which the hydrothermal process is conducted. For example, the invention contemplates retention of the particle size in a final molecular sieve-containing product that corresponds with that of an amorphous cation oxide-framework nutrient used in its manufacture. This invention drives the selection of process conditions to achieve one or more of macro and meso porosity ("large pore composite porosity") in the final molecular sieve product as a direct product of the hydrothermal reaction producing the molecular sieve. The invention allows the production of a molecular sieve that is in situ incorporated in the framework morphology of a solid cation oxide-framework used in the molecular sieve's manufacture.

8 Claims, No Drawings

METHOD FOR MAKING MOLECULAR SIEVES AND NOVEL MOLECULAR SIEVE COMPOSITIONS

This is a Continuation of application Ser. No. 08/939,271, filed Sep. 29, 1997 now U.S. Pat. No. 6,004,527

BRIEF DESCRIPTION OF THE INVENTION

A method that stems from a discovery that the intrinsic porosity characteristics of a nutrient that possesses an amorphous cation oxide-framework can be substantially retained in the final molecular sieve containing product formed by a hydrothermal process by carefully controlling the conditions under which the process is conducted. This invention drives the selection of process conditions to achieve one or more of macro and meso porosity in the final molecular sieve product as a direct product of the hydrothermal reaction producing the molecular sieve. The invention allows the production of a molecular sieve that is incorporated in the framework morphology of a solid cation oxide-framework used in molecular sieve's manufacture.

The invention is directed to a novel solid molecular sieve composition that contains a) a preformed porous geometric framework where the pores are one or more of macro and meso pores, and
b) interconnected in situ formed crystalline molecular sieve particles that
   (i) contain micro pores and
   (ii) are structural components of the framework.

BACKGROUND TO THE INVENTION

The definition of molecular sieve, according to Szostak, "Molecular Sieves, Principles Of Synthesis And Identification," 1989, Van Nostrand Reinhold, New York, N.Y., at page 3, is "A molecular sieve framework is based on an extensive three-dimensional network of oxygen ions containing generally tetrahedral-type sites. In addition to the $Si^{+4}$ and $Al^{+3}$ that compositionally define the zeolite molecular sieves, other cations also can occupy these sites. These cations need not be isoelectronic with $Si^{+4}$ and $A^{+3}$, but must have the ability to occupy framework sites. Cations presently known to occupy these sites within molecular sieve structures are $(M^{+2}O_2)^{-2}$ where M is Be, Mg, Zn, Co, Fe, Mn
$(M^{+3}O_2)^{-1}$ where M is Al, B, Ga, Fe, Cr
$(M^{+4}O_2)^0$ where M is Si, Ge, Mn, Ti
$((M^{+5}O_2)^{+1}$ where M is P"

The term molecular sieve encompasses the variety of structures within the classification set forth in FIG. 1.1 of Szostak, supra, page 2, which classification is incorporated by reference. Molecular sieves come in two varieties, zeolitic molecular sieves ("ZMS") and non-zeolitic molecular sieves ("NZMS"). Szostak (page 4) treats aluminosilicates generally to be ZMS provided there is at least one aluminum ion per unit cell based on the bulk composition of the sample. The remaining structures are recognized to be NZMS. According to this characterization, the ZSM-5 structure is considered a ZMS at silica/alumina less than 190 and NZMS above 190. This same convention holds when ZMS's contain trace amounts of other elements in the framework ion positions. (See Szostak, page 5, who considers a crystalline structure a ZMS if the number of other cations in the framework, other than aluminum and silicon, averages less than one per unit cell, all others being a NZMS.)

Zeolitic molecular sieves are typically made from a source of silica that is reacted with a source of aluminum, in the presence of materials that insure significantly alkaline conditions, water and $^-OH$. The mix of the reactants may be called the reaction's nutrients. Many of the reactions are conducted in the presence of an organic template or crystal-directing agent, which induces a specific zeolite structure that can not be formed in the absence of the organic template. Most of the organic templates are bases, and many introduce hydroxyl ions to the reaction system. The reaction involves a liquid gel phase ("soup") in which rearrangements and transitions occurs, such that a redistribution occurs between the alumina and silica nutrients, and structural molecular identities corresponding to specific zeolites or other molecular sieves are formed. It is known that zeolites are not often formed above 350° C., though descriptions of higher temperature formation of certain molecular sieves has been mentioned in the literature (see Szostak, supra, page 52). Lower temperatures than about 100° C. require extensive crystallization time. As Szostak, supra, page 54, points out Upon mixing of the reagents on the synthesis of zeolite molecular sieves, a gel generally is observed to form, which with time begins to separate into two phases: a solid and a liquid. Visually, as the crystallization progresses, the gel plus the forming crystals increases in density and begins to settle to the bottom of the crystallization vessel, as the forming zeolite crystals have a density greater than that of the initial gel. Thus successful crystallization sometimes can be suspected if a very dense, easily settling solid phase is observed in the crystallization vessel when the crystallization is terminated.

When the desired crystal structure is obtained, the molecular sieve is brought to ambient temperatures and the crystallization process is arrested. The product of the reaction is isolated typically as a loose powder. The crystals that are formed in the powder are so assembled in the structure as to form special micro pores and micro pore openings of a kind that distinguishes the structure. The resulting crystals are an assemblage of individual units the growth of which may be small, medium or large, depending on the conditions employed in the traditional method. The crystals may then, in the usual case, be formed into composite structures that allow their use as, e.g., absorbents and catalysts.

A number of references describe processes for making ZMS by reacting an amorphous precursor in the presence of a small amount of water to form a dense interbonded mass. The amount of water is selected to be less than that which is used in the aforementioned traditional method but large enough to interbond the ZMS particles into dense masses.

For example, Haden et al., U.S. Pat. No. 3,065,064, convert to a ZMS, a dehydrated kaolin clay having a $SiO_2/Al_2O_3$ mol ratio of about 2, in the presence of a "concentrated aqueous solution of NaOH." The $H_2O$ to $Na_2O$ mol ratio in the mixture is within the range of 4.5–11.5 "and being present in an amount such that the $Na_2O/SiO_2$ mol ratio in the mixture is about 0.5." According to Haden et al.:

". . . the alkali is then reacted with the alumina and/or silica of the dehydrated aluminum silicate until substantially all of the alkali is consumed, such reaction being carried out while controlling the temperature of the mass below that at which water will be evaporated from the mass at the pressure employed and in the absence of an aqueous liquid phase external to and in contact with the mass. The reaction product is a coherent mass of substantially homogeneous amorphous composition and is the precursor of the desired synthetic crystalline zeolite. The amorphous reaction product is then aged without substantial dehydration thereof, preferably at elevated temperature under autogenous pressure or greater, to crystallize the material into the desired substantially homogeneous polycrystalline zeolite of the empirical formula $Na_2O.Al_2O_3.2SiO_2 4–5H_2O$ in the form of a hard coherent mass of essentially the same volume as the original aluminum silicate-alkali mass."

According to the patentee, the object of the process is to form the ZMS into a "compact mass or masses" which is defined as a "dense or substantially nonporous mass." The patentee states, "only such dense masses react to provide a sufficient number of structural bridges between crystals to form the zeolite in the desired form of hard crystalline aggregates occupying essentially the same volume as the unreacted mass as opposed to the finely divided or pulverulent masses inherently formed in carrying out prior art methods for producing the synthetic crystalline zeolite A."

Miller, U.S. Pat. No. 5,558,851, patented Sep. 24, 1996, relates to shaped zeolite structures wherein the reactants, in making the structures, are formed into a water-wet thick paste and crystallized after forming into a shaped structure. According to Miller's process, and as practiced by Haden et al., crystallization occurs without the presence of an "external liquid phase."[1] Needless to say, Miller's process transforms the reactants into the typical hydrothermally induced liquid phase reaction. According to Miller, the zeolites in the shaped structures contain "very small crystallites." Miller's use of low amounts of alkali metal should be expected to generate smaller crystallites (See Szostak, supra, page 73). As is the case with Haden et al., supra, Miller interbonds the ZMS particles so as to form the dense mass structure described by Haden et al.

[1] Compare with the "in the absence of an aqueous liquid phase external to and in contact with the mass" description of Haden et al., supra.

According to Miller's example 16 (specifically at column 21, lines 1–20), a mixture of TPAOH, NaOH and water were combined with a mixture of silica and sodium aluminate, and the combination was mixed for 3 hours. A paste was formed of the combination by the addition of more water. Miller then combined the technique of Haden et al., supra, by the addition of kaolin clay, and he reduced the volatiles level to 53 weight percent by continued mixing at 60° C. Miller then air-dried the mixture to form a powder of 48 weight percent volatiles. According to Miller, "[t]he molar ratio of $H_2O/SiO_2$ at this point was about 2.5." It is assumed that the powder was an aggregation of pasted particles that no longer exhibit the particulateness and porosity of the silica. Miller placed the powder into a Teflon bottle and the bottle was placed "in a stainless steel pressure vessel and heated at 140° C. and autogenous pressure for two days." According to Miller, the "resulting product was washed with water, dried overnight in a vacuum oven at 120° C., and calcined in air for three hours at 593° C." Miller states that "X-ray diffraction analysis showed the product to be nearly 100% ZSM-5. The average crystallite size by SEM was about 0.1 micron."

Ramesh B. Borade and Abraham Clearfield, ("Borade and Clearfield")[2] make a zeolite Beta in a 24 hour synthesis at 170° C. from an extremely dense system in which the weight ratio of solid, measured as sodium aluminate and silica, to liquid, measured as tetraethylammonium hydroxide and water, mixtures is 1:1.8. They found that the product has comparable catalytic properties to samples prepared by previous methods. According to the detail description of Borade and Clearfield, the amount of the aforementioned liquid component "is just sufficient to wet all the solid particles and in some cases (especially at Si/Al ratio<10) the reaction mixture is in the form of small lumps." According to the authors, the process uses "a much smaller proportion of TEAOH and shorter reaction time as compared to the usually synthetic methods." Lowering the proportion of TEAOH allows the decrease in the amount of water content. "This change increases the weight ratio of solid to liquid in the systems from 1:9.1 to 1:1.8. The mole ratios of $SiO_2/$ TEAOH increased from 0.53 to 6 and $H_2O/SiO$, decreased from 23 to 6.1."

[2] "Synthesis of zeolite Beta from dense system containing a minimum of template," Catalysis Letters, 26 (1994) 285–289.

The procedure employed by Borade and Clearfield is as follows: "Sodium aluminate, TEAOH and water were mixed and stirred for about 15 minutes. Then, this solution was added to a highly reactive fumed silica and stirred with a spatula for about 15 minutes. Initially, the mixture appears to be a dry powder. As stirring continued for about 2 hours the mixture turned into a very dense and thick solid (solid: liquid ~1:2), which was transferred into a stainless-steel autoclave and heated at 443 K and autogenous pressure for 24 hours. The pH of the initial reaction mixture was in the range 13.2–13.8 and after crystallization it was in the range 11.4–12.0. After synthesis samples were dried at 120° C. and then calcined at 540° C. for about 15 hours." According to the authors, "[T]he marked reduction in the use of TEAOH in the present method (2.5 versus 10–28 moles of TEAOH with reference to 1 mole of $Al_2O_3$), shorter crystallization time (24 hours versus 4–10 days) and increased productivity (per batch) should lead to a lower synthesis cost of zeolite Beta. The product obtained also has comparable catalytic properties at least with reference to the cracking of hexane."

The methods of Haden et al., U.S. Pat. No. 3,065,064, Miller, U.S. Pat. No. 5,558,851, and Borade and Clearfield, take a common approach to making ZMS, by reducing the amount of gelation of $SiO_2$. This is accomplished by the use of smaller amounts of water than has been used in the traditional process for making ZMS. As a result, Borade and Clearfield produce a very dense and thick solid, Miller produces a paste that forms a dense and thick solid, and Haden et al. produce a dense or substantially nonporous mass.

In effect, these authors have developed a process that depends on surface gelation of the silica particles for ZMS formation. Surface gelation occurs at the particle interior and exterior surfaces. It allows the particles to become glued to each other by interfacial wetting of one viscid exterior surface by another. It also affects the interior pores by filling or collapsing pores thereby reducing the particle's pore volume.

Surface gelation allows Haden et al. and Miller to make shaped ZMS structures. However, such surface gelation as pointed out by Haden et al. results in a relatively nonporous structure, meaning that the macro and meso pores[3] of the silica are eliminated by the gelation and bonding that occur in their processes.

It is well known that molecular sieves are made from cation-oxide containing materials, such as silica and alumina, which prior to hydrothermal conversion contain macro and meso pores and a geometric framework that surrounds and forms such pores. In the thermal conversion of these porous materials, the framework is degraded and the framework becomes part of a viscid (gelatinous) soup, no longer capable of providing the macro and meso pore network. The typical product of the typical hydrothermal conversion is a powdery precipitate.

Haden et al., U.S. Pat. No. 3,065,064, Miller, U.S. Pat. No. 5,558,851, and Borade and Clearfield, operate a "non-soup" hydrothermal process designed to create an amount of surface gelation that essentially eliminates the porosity inherent in the precursor cation-oxide containing framework materials in order to form a paste and achieve increased density.

There is described in the heterogeneous catalyst art a number of processes for forming a catalyst. One method is characterized as an impregnation of the catalyst support with liquid reagents that deposit in the pores of the support. It is commonly known as an impregnation process. The amount of liquid reagent deposited on the support leaves an apparent incipient wet film Those ingredients invariably react on the surface of the support to form the catalyst. The support is not changed by virtue of such treatment, and retains its original porosity. In most cases, the support is not thought to react with the liquid reagents. (See Stiles and Koch, *Catalyst Manufacture, Second Edition*, 1995, published by Marcel Dekker, Inc., New York, N.Y. 10016.)

There is no process known in the art that causes conversion of conventional molecular sieve forming nutrients that retains macro and meso porosity characteristics of a geometric framework cation-oxide containing nutrient. It would be desirable to produce molecular sieves that possess a framework morphology characteristic of at least one of cation oxide containing nutrients in the reaction. It would be desirable to have a reaction of the typical nutrients in the formation of a molecular sieve that retains the framework morphology characteristic of at least one cation oxide containing nutrients in the reaction.

[3] As used herein, "macro pores" means above 500 angstroms (over 50 nanometers); "meso pores" means 20 to 500 angstroms (2–50 nanometers); "and micro pores" means less than 20 angstroms (under 2 nanometers). Also, in the terms describing the invention of this application, the terms "large pore" and "large pores," encompass structures that contain macro and/or meso pores.

THE INVENTION

This invention relates to the synthesis of large pore composite molecular sieves and to the synthetic large pore (as defined herein) composite molecular sieves so produced. The molecular sieves of the invention have the same general utilities of the comparable molecular sieves of the prior art. However, the large pore composite molecular sieves of the invention have been found to be superior catalysts and absorbents to the compositionally and structurally comparable molecular sieves of the prior art. This superiority is seen to result from the large pore composite feature of the composite molecular sieves obtained by the process of the invention.

This invention relates to a hydrothermal synthesis of composite molecular sieves from nutrients, at least one of which contains an amorphous framework-structure, and which framework-structure is essentially retained in the synthetic molecular sieve. This invention stems from a discovery that the intrinsic porosity characteristics of a nutrient that possesses an amorphous cation oxide-framework can be substantially retained in the final molecular sieve containing product formed by a hydrothermal process by carefully controlling the conditions under which the hydrothermal process is conducted For example, the invention contemplates retention of the particle size in a final molecular sieve-containing product that corresponds with that of an amorphous cation oxide-framework nutrient used in its manufacture. The invention further contemplates hydrothermal impregnation of an amorphous cation oxide-framework having an average particle size of about 0.1 microns to about 5 millimeters with aqueous containing nutrients to produce a molecular sievecontaining structure therefrom that has essentially the same average particle size. This invention drives the selection of process conditions to achieve one or more of macro and meso porosity ("large pore composite porosity") in the final molecular sieve product as a direct product of the hydrothermal reaction producing the molecular sieve. The invention allows the production of a molecular sieve that is in situ incorporated in the framework morphology of a solid cation oxide-framework used in the molecular sieve's manufacture.

This invention relates to the hydrothermal treatment of nutrients used in the manufacture of molecular sieves where at least one of the nutrients possesses geometric frameworks that contains one or more of macro and meso porosity (the "framework porosity") within it. According to this invention, hydrothermal conditions are selected to preserve at least 25 volume percent of the framework porosity, preferably 50 volume percent of the framework porosity, while at the same time effecting reaction of the nutrients such that a molecular sieve is formed within the boundaries of the framework-structures. The process of this invention effects intermolecular reactions of the nutrients such that a molecular sieve of the type desired is formed while at the same time substantially preserving the geometric framework-structure or morphology of at least one of the nutrients possessing said geometric frameworks The process of this invention uses a nutrient with a porous framework-structure. The process of this invention effects at least partial reaction and transformation of the framework nutrient without destroying the porous nature of the framework In another aspect of this invention, the process of the invention involves the incremental reaction of impregnated nutrients within a cation oxide geometric framework that is suitable for forming a molecular sieve therein. The added nutrients react with the cation oxide geometric framework in such a way that it allows one to produce a crystalline molecular sieve within such framework. In this embodiment, the framework-structure is impregnated by the incipient wetness method with the additional nutrients, in one or more steps to produce a uniform distribution within the structure. It is believed that the added nutrients react within the framework-structure in such a way that they meter the rate at which solubilization occurs during the induction period to molecular sieve growth and/or during the molecular sieve crystallization process. This allows for an ordered reaction of the added nutrients with the framework-structure nutrient, and this insures and promotes high yields of molecular sieve in the framework-structure while retaining the large composite pores provided by the cation oxide geometric framework.

The original framework-structure is amorphous, and the final framework-structure after crystallization contains a substantial crystalline content, typically at least 15 weight percent, preferably at least 25 weight percent, more preferably at least 40 weight percent and most preferably at least 50 weight percent, basis weight of the molecular sieve. The final framework-structure may contain from 75 to 100 weight percent crystalline molecular sieves, basis weight of the molecular sieve.

This invention relates to a "dry" process for the making of a molecular sieve by impregnating a solid cation oxide-framework-structure with other nutrients suitable for a hydrothermal reaction between the other nutrients and the solid cation oxide-framework-structure, to form an impregnated paste-free composition. Then the impregnated paste-free composition is subjected to conditions of temperature and pressure to effect a hydrothermal reaction and convert the nutrients of the reaction into a crystalline molecular sieve that possesses the morphologic characteristics of the solid cation oxide-framework-structure.

The method of this invention for making a molecular sieve comprises
  a) crystallizing at an elevated temperature,
    i) a solid amorphous cation oxide-containing framework material possessing framework porosity and physical boundaries,
    ii) optionally in the presence of a pore forming material (template),
    iii) in the absence of an amount of free water (as contrasted with bound water) that is sufficient to cause substantial surface gelation, and
  b) transforming the solid macro and meso pore-containing amorphous cation oxide-containing framework material into a solid molecular sieve-containing product having the physical boundaries and morphology of the solid pore-containing amorphous cation oxide-containing framework material and a framework porosity similar to the framework porosity of the amorphous cation oxide-containing framework material.

Specifically, the invention relates to a method for making a molecular sieve, such as a zeolite, by crystallizing into a molecular sieve, solid shaped amorphous silica framework' materials ("solid material") possessing a level of framework porosity, by heating the solid materials in the presence of
  (a) an aluminum containing component residing within the pores of the solid material and
  (b) a small quantity of water that contains, as needed, a micro pore forming component, sufficient to crystallize the silica and transform a significant portion of the solid material into a molecular sieve,
    1. without significantly changing the shape of the solid materials and
    2. without causing substantial surface gelation of the solid materials that causes interbonding of the solid materials to occur.

The invention is directed to a novel solid molecular sieve composition that contains
  ii) a preformed large pore geometric framework-structure, and
  iii) crystalline molecular sieve particles that contain micro pores therein occupying structural components of the framework-structure.

DETAILED DESCRIPTION OF THE INVENTION

In the description of the invention, the effects of "surface gelation" distinguish the prior art from this invention. In the case of the prior art, surface gelation of the cation oxide-framework causes loss of large pore composite porosity in the resulting molecular sieve containing structures and that affects their performance capability. In the practice of this invention, impregnation of a large pore cation oxide keeps surface gelation to a minimum and there is minimal loss of large pore composite porosity of the cation oxide-framework. As a result, the molecular sieves of the invention are more active catalysts and better absorbents than comparable molecular sieve containing structures.

The invention relates to novel molecular sieve containing structures and processes for making the structures. The molecular sieves of the invention cover the wide variety of synthetic ZMS's and NZMS's known in the art, each embodied within a framework-structure structure possessing framework meso and/or macro, i.e., large pore composite porosity. The process of the invention meters the interreactions of the molecular sieve nutrients, at least one of which is amorphous framework-structure, and through such metering, one can control surface gelation, cation transitions, molecular sieve crystal size, and structural integrity within such framework-structure. For example, the process of the invention limits the amount of liquid in the hydrothermal reaction such that there is very little to no surface gelation visible to the naked eye. In other words, the reaction appears to be "dry" because the liquid provided to the reaction wets the interior voids of the amorphous framework nutrient. It is believed that the chemical reactions occurring within the amorphous framework-structure predominantly occur within the pores of the amorphous framework-structure. However, the nature of these reactions is such that the porosity of the amorphous framework-structure is essentially retained. If the amount of liquid, in any such case, were to destroy the interior voids of the framework-structure during hydrothermal reaction, then the amount of liquid is probably too great for the objectives of this invention, and should be reduced in order to preserve such porosity and framework-structure. It is believed that the conversion of a amorphous cation oxide-framework-structure to a molecular sieve containing structure is a phase transition involving either a solid-solid transformation (see R. Szostak, ra, page 190) or a viscid gel surface reaction that creates nuclei crystals which grow to the molecular sieve crystals. The reaction is believed to advance from the interior voids of the particle by a phase transition of the surface of the particle structure and subsequently proceeds to consume the particle throughout the structure as crystallization progresses substantially uniformly therein.

This "dry" process for the making a molecular sieve involves impregnating a solid cation oxide-framework-structure with other nutrients such as water and a micro pore forming agent (e.g., an organic templating agent and/or a metal (e.g., an alkali or alkaline earth metal base)) without forming a paste and without destroying the structure of the cation-oxide framework The impregnation is suitable for a paste-free hydrothermal reaction between the other nutrients and the solid cation oxide-framework-structure. The impregnated paste-free composition is subjected to conditions of temperature and pressure to effect a surface hydrothermal reaction and convert the nutrients of the reaction into a crystalline molecular sieve that possesses the morphologic characteristics of the solid cation oxide-framework-structure.

The "dry" reaction between the molecular sieve nutrients occurs at the interior surfaces of the amorphous framework-providing nutrient. Consequently, the amorphous framework-providing nutrient is maintained dry thereby preserving the structural integrity of the framework-structure of one of the ingredients. A dry reaction, as used herein, means that the amount of surface gel formation is insufficient to cause destruction of framework porosity of a framework precursor, such as particles of silica, alumina, alumino-silicate, titanium oxide, zirconium oxide, gallium oxide, arsenic oxide, germanium oxide, metal phosphate, and the like. For example, if the amorphous framework-providing nutrient were a free-flowing particle, it would remain free flowing after impregnation by the other nutrients used in the hydrothermal reaction and before the hydrothermal reaction.

However, it is contemplated according to the invention that individual framework-structures may be interbonded prior to the hydrothermal reaction and in many such cases, the interbonding creates macro pores within the interbonded structure. For example, porous framework material can be subjected to the hydrothermal conditions of reaction and can undergo subde surface gelation to structural points on the exterior of the framework Such surface gelation causes bonding with adjacent framework-structures, and the interbonding typically creates additional porosity, typically macro pores in the aggregated structure. This bonding results in clustering and aggregations of the molecular sieve containing framework-structures. Thus the amorphous framework-structure that one may use in making the molecular sieves of the invention may be particulate structures, and any bonded amorphous framework-structure that contains porosity within which the dry process can be conducted. The invention can be carried out with small, medium and large size porous particles and any porous macrostructure of such particles, including monolithic and joined monolithic structures. Such an interbonded structure may then be subjected to hydrothermal conditions of reaction in the presence of the correct nutrients to cause the formation of molecular sieve crystals therein without destroying the porosity and shape of the structure.

A significant embodiment of this invention involves the process of making small crystalline molecular sieve particles that are of a size amenable to extrusion and other molding processes into catalyst structures. According to this process, cation oxide particles such as silica, alumina, aluminosilicate, titanium oxide, zirconium oxide, gallium oxide, arsenic oxide, germanium oxide, metal phosphate, and the like, are comminuted to a smaller size porous particle than the ultimate molecular sieve composite particle size. These smaller particles are composited by conventional means to larger uniform large porecontaining particles, e.g., having a mean average particle size of about 5mm, suitable for making catalysts. Then the composited particles are subjected to hydrothermal reaction conditions according to the invention to make a molecular sieve-containing product that is ideal for catalysts in reactions that molecular sieves are conventionally employed.

The selection of process conditions in the practice of this invention is dependent upon the proportion of nutrients, especially the amount of liquid in the nutrient mixture and the absorptive properties of the amorphous cation oxide-framework-structure. For example, the amount of water should be insufficient to cause pore elimination and full densification of the framework-structure. The amount of water should be insufficient to cause the formation of a paste from the nutrients. The absorptive properties should be sufficient to assure a dry reaction, as defined above. In most instances, the amorphous framework-structure is subjected to conditions sufficient to either maintain a low bound water content in the structure or to sufficiently dry the amorphous framework-structure to achieve a low bound water content. This is achieved by calcining the amorphous framework-structure at a temperature and for a period of time to remove excess bound water from the framework-structure. Typically, calcination is effected at a temperature, at normal conditions, of at least 150° C. to about 1000° C., or higher, until the desired water content is achieved. Lower temperatures result in longer calcination times and higher temperatures result in shorter calcination times. The desired bound water content of the amorphous framework-structure is dependent on the amount of molecular sieve crystal development one desires in the final product and the amount of water that it is desirable to add in the process. The more water that one desires to add to the amorphous framework-structure the less bound water one will tolerate in the amorphous framework-structure. There is no clear limit on the amount of water that is tolerated in the amorphous framework-structure and is useable in the hydrothermal process other than the limitation that the amount should be such as to provide for a dry reaction, as defined above. For example, the amount of water that can be used to effect the dry reaction might, in the presence of different nutrients, cause the formation of a paste or a soup because of the amount of water that is provided by the nutrients. Generally, the water content of the nutrients is not mentioned or adequately controlled by the prior art.

In addition, the hydrothermal reaction should be carried out in a sealed reaction vessel, typically at autogenous pressure, at moderate temperatures, such as from about 25° C. to about 500° C., preferably from about 75° C. to about 350° C. and more preferably from about 100° C. to about 250° C. The reaction has been most effectively carried out at temperatures of about 150° C. Contrary to the conventional "soup" hydrothermal reaction, the process of the invention does not generate a liquid or paste phase that is separable from the solid crystal phase. Any liquid or paste phase is to be avoided in carrying the impregnation process of the invention. After the hydrothermal reaction has been carried out, typically within 2 to 130 hours, the solid reaction product containing the framework-structure of a framework nutrient of the reaction may be used as such, or calcined to generate desired properties in the final product. That calcination may range from about 150° C. to about 1000° C., preferably from about 300° C. to about 700° C., and most preferably, from 400° C. to about 650° C. The resulting molecular sieve may then be used without any further processing, such as water washing and filtering. However, water washing and filtration may be employed if the cleanliness of the product dictates that such treatments are desirable.

The framework precursor to the framework-structure of the molecular sieve of the invention, may be any one of a variety of cation oxide containing nutrients used in making molecular sieves. It may be a silica, an alumina, a titanium oxide, a zirconum oxide, a gallium oxide, an arsenic oxide, a germanium oxide, a metal phosphate, and the like. Such framework-structure, as pointed out above, may be small to large particles; aggregates of particles, fused particles, extruded particles, molded particles, sheets of bonded particles, monolithic fused particles, and the like, provided there is a porous framework inherent in such structures.

A preferred amorphous framework-structure nutrient for use in the process of the invention is silica, typically containing a low water content. Most desirably, the silica is a synthetic material. Any process may be used to form such silica so long as the silica contains large pores, as defined herein. For example, the silica may be formed by precipitation from a solution, by fuming silica forming materials, and the like processes. A very desirable framework-structure is silica, typically a pure silica (i.e., it does not contain any other cation oxide component), that has been reacted with a solvent soluble aluminum source incorporated by impregnation up to incipient wetness of the silica, without destroying the amorphous framework-structure of the silica, allows on heating the formation of an aluminum silicate therefrom. It is believed that such ingestion of aluminum into the silica framework, aids in the subsequent dry hydrothermal processing of nutrients to form the molecular sieves of the invention.

Suitable solvent soluble aluminum sources include alkali metal (e.g., Li, Na, K, Rb, Cs) and alkaline earth metal (e.g., Be, Mg, Ca, Sr, Ba) salts of aluminum hydroxides and aluminas, aluminum salts of inorganic and organic acids, such as aluminum nitrate, aluminum sulfate, aluminum chloride, aluminum phosphate, aluminum monoacetate, aluminum diacetate, aluminum triacetate, aluminum monocitrate, aluminum dicitirte, aluminum tricitrate, and mono, di, and tri alkyl (e.g., $C_1$–$C_8$) esters of aluminum hydroxide. The reaction is typically carried out by forming a solvent solution or liquid dispersion of the solvent soluble aluminum source and mixing it with the silica framework-structure up to incipient wetness of the silica framework-structure, followed by heating sufficiently to effect transformation of the aluminum by reaction with the silica surface and/or reaction with the silica bulk itself. The reaction conditions are essentially the same conditions as the hydrothermal reaction used in forming the molecular sieve except that a micropore-forming agent is not present in the reaction. The solvent used in the reaction is typically water, though organic solvents such as alcohols, organic acids, polyols, and the like, may be employed instead. The amount of solvent soluble aluminum incorporated into the amorphous framework-structure is dependent on the amount of aluminum desired in the molecular sieve structure of the invention. Generally, the impregnation up to incipient wetness of the silica with the aluminum source in the solvent takes up to about 1 to 2 hours.

After the Al incorporation reaction has been carried out, typically within 2 to 130 hours, the solid reaction product containing the framework-structure of a framework nutrient of the reaction may be used as such, or calcined to generate desired properties in the final product. That calcination may range from about 150° C. to about 1000° C., preferably from about 300° C to about 700° C., and most preferably, from 400° C. to about 650° C. The resulting molecular sieve may then be used without any further processing, such as water washing and filtering.

Templates for the hydrothermal reaction may be any of those known in the art for controlling molecular sieve micro porosity, and influencing the reaction to the desired molecular sieve crystals. The template is generally characterized as an ion or neutral species which upon its addition to the reaction mixture, crystallization is induced of a specific zeolite structure that could not be formed in the absence of the agent. Inorganic cations acting as counterions also are dominant in determining which zeolite structure is obtained. It is known that the cations can influence crystal morphology, crystallinity, and yield. (See Szostak, supra, page 73) It has been shown that such inorganic cations can influence crystal size. Suitable inorganic cations are the alkali metals (Li, Na, K, Rb, Cs), the alkaline earth metals (Be, Mg, Ca, Sr, Ba), the transition metals Hi, Zr, Hf, V, Nb, Ra, Cr, Mo, W, Mn, Tc, Re, Fe, Ru, As, Co, Rh, Ir, Ni, Pd, Pt, Cu, Ag, Au, Zn, Cd, Hg), and the like. In general the templating agent may be an organic compound that contain elements of Group VA of the periodic Table of Elements, particularly nitrogen, phosphorus, arsenic and antimony, preferably N or P and most preferably N. The compounds also contain at least one alkylene, alkyl or aryl group having from 1 to 8 carbon atoms. Particularly preferred nitrogen-containing compounds for use as templating agents are the antines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. Both mono-, di- and triamines are advantageously utilized, either alone or in combination with a quaternary ammonium compound or other templating compound. Mixtures of two or more templating agents can either produce mixtures of the desired molecular sieve or the more strongly directing templating species may control the course of the reaction with the other templating species serving primarily to establish the pH conditions of the reaction gel. Illustrative organic templating cations are the following: tetramethylamonium ("TMA"), tetraethylanmuonium ("TEA"), tetra-n-propylammonium ("TPA"), tetra-isopropylamnmonium, tetrabutylammonium ions, di-n-propylamine, di-n-butylamine, tri-n-propylamine, trietylamine, tributylamine, triethanolamine, quinuclidine ("Q"), methyl quinuclidine hydroxide, cyclohexylamine, neopentylamines, N,N-dimethylbenzylamine, N-N-dimethylethanolamine, di-n-pentylamine, isopropylamine, t-butylamine, ethylenediamine; hexamethylenediamine, pyrrolidine; and 2-imidazolidone, piperidine, 2-methylpyridine, N,N'-imethylpiperazine, N-methyldiethanolamine, N-methylethanolamine, N-methylpiperidine, 3-methylpiperidine, N-methylcyclohexylamine, 3-methylpyridine, 4-methylpyridine, diethylpiperidinium ("DEPP"), trimethylbenzylammonium ("TMBA"), tetramethylphosphonium ("TMP"), 5-azoniaspiro(4,4)nonane or bispyrrolidinium ("BP"), (2-hydroxyethy)trimethylammonium ("choline"), 1,4-dimethyl-1,4-diazoniabicyclo(2,2,2)octane ("DDO"), 1,4-diazoniabicyclo(2,2,2)octane ("DO" or "DABCO"), N,N'-dimethyl-1,4-diazabicyclo (2,2,2) octane ion. It is well understood by the art that every templating agent will direct the formation of every species of molecular sieve, i.e., a single templating agent can, with proper manipulation of the reaction conditions, direct the formation of several molecular sieve compositions, and a given molecular sieve composition can be produced using several different templating agents.

The variety of molecular sieve covered by this invention includes all of the synthetic molecular sieves. The invention embraces all molecular sieves that can be made by chemical synthesis. This includes such ZMS as the faujasite (Types X and Y), mordenite, cancrinite, gmelinite, Type L, mazzite, offretite, omega, ZSM-12, beta, ZSM-5 and silicalite, ZSM-11, dachiardite, epistilbite, ferrierite, laumontite, stilbite, ZSM-23, theta-1 and ZSM-22, Eu-1 and ZSM-50, ZSM-48 and Eu-2, Type A and ZK-5, bikitaite, brewsterite, chabazite, TMA-E and AB, edingtonite, erionite, gismondine, heulandite, levyne, merlinoite, natrolite, phillipsite, paulingite, rho, thomsonite, yugawaralite, and the like. It also includes the variety of NZMS's that have been discovered such as the aluminophosphate molecular sieves, whose acronyms are set forth in the following table:

| Cations | Acronym | Canons | Acronym |
|---|---|---|---|
| Al, P | $AlPO_4$ | Me, Al, P, Si | MeAPSO |
| | | Fe, Al, P, Si | FAPSOA |
| Si, Al, P | SAPO | Mg, Al, P, Si | MAPSO |
| | | Mn, Al, P, Si | CoAPSO |
| Me, Al, P | MeAPO | Co, Al, P, Si | CoAPSO |
| Fe, Al, P | FAPO | Zn, Al, P, Si | ZAPSO |
| Mg, Al, P | MAPO | | |
| Mn, Al, P | MnAPO | Other Elements: | |
| Co, Al, P | CoAPO | El, Al, P | ElAPO |
| Zn, Al, P | ZAPO | El, Al, P, Si | ElAPSO |
| | | | See Szostak, supra, page 211 |

A listing of such NZMS can be found in U.S. Pat. No. 4,440,871, to Lok et al., and U.S. Pat. No. 4,791,083, to Pellet et al., and such listing, and citations of patents and applications where the manufacture of such NZMS can be found, are incorporated herein by reference. A variety of non-aluminosilicate molecular sieves are characterized by Szostak, Sura, at table 4.1 (page 209), which is reported below for convenience, and such non-aluminosilicate molecular sieves are incorporated herein by reference.

Some metallosilicate molecular sieves reported in the patent literature and their known zeolite structure type.

| ASSIGNEE | COMPOSITION (NAME) | STRUCTURE | PATENT NO. |
| --- | --- | --- | --- |
| AIST* | iron silicate | ZSM-5 | Japan 110 421 |
| Amoco | Borosilicate (AMS-1B) | ZSM-5 | U.S. Pat. No. 4,269,813 |
| | Chromosilicate (AMS-1Cr) | ZSM-5 | U.S. Pat. No. 4,299,808 |
| Aristech | Magnesium silicate | ZSM-5 | U.S. Pat. No. 4,623,530 |
| BASF | Arsenic silicate | ZSM-5 | Germany 2 830 830 |
| | Chromosilicate | ZSM-5 | Germany 2 831 630 |
| | Iron silicate | ZSM-5 | Germany 2 831 611 |
| | Niobium-aluminosilicate | ZSM-5 | EP 0 089 574 |
| | Niobium-borosilicate | ZSM-5 | EP 0 089 574 |
| | Vanadium silicate | ZSM-5 | Germany 2 831 631 |
| | Borosilicate (ZBH) | Pentasil | EP 0 077 946 |
| | Metallosilicate (Al, B, Ga, Ge) | ZSM-5 | EP 0 046 504 |
| Bayer | Zinc silicate | — | EP 0 071 136 |
| BP | Gallosilicate (Ga-theta-1) | Theta-1 | EP 0 106 478 |
| | Gallosilicate | Analcite | UK 2 102 779 |
| | Gallosilicate | ZSM-5 | PCT W 04/03879 |
| | Gallosilicate | ZSM-39 | UK 2 144 727 |
| Union Carbide (now UOP) | iron silicate (FeSO-35) | Levynite | EP 0 115 031 |
| | iron silicate (FeSO-38) | Mordenite | EP 1 108 271 |
| Chevron | Chromosilicate (CZM) | ZSM-5 | Belgium 884 871 |
| CRIQ** | Titanoborosilica (ZMQ-TB) | ZSM-5 | EP 0 104 107 |
| | Ironborosilicate | ZSM-5 | EP 0 148 038 |
| Hoechst | Boro-aluminosilicate | — | EP 0 073 482 |
| | Gallium/indium silicate | ZSM-34 | EP 0 074 651 |
| | Gallium/indium silicate | — | EP 0 074 652 |
| | Zirconium/hafnium silicate | — | EP 0 094 023 |
| | Titanosilicate | — | EP 0 094 024 |
| Hüls | Metallosilicates (transition metals) | — | EP 0 072 054 |
| Idemitsu | Borosilicate | — | Japan O7 817 |
| | Borosilicate | — | Japan O7 821 |
| Mitsubishi | Metallosilicates (transition metals) | — | Japan O7 820 |
| | Metallosilicates (Ni, W. Cr. Fe, Ti, Mo) | — | EP 070 757 |
| | Metallosilicates (transition metals) | — | Japan O7 82J |
| | Metallosilicates (transition metals) | — | Japan 11 818 |
| Mobil | Metallosilicate (Al, Cr. Fe, La) | Beta | EP 0 064 328 |
| | Iron/chromium silicates | ZSM-12 | EP 013 630 |
| | Iron/chromium silicates | ZSM-11 | EP 014 059 |
| National Distillers | Borosilicate (USI-10B) | — | U.S. Pat. No. 4,423,020 |
| Nat. Res. Dev. | Metallosilicate (Zn, Sn, Ti) | A, X | EP 027 736 |
| Shell | iron silicate | ZSM-5 | France 2 403 975 |
| | Cobalt silicate | ZSM-5 | EP 0 061 799 |
| Shin Nenryoyu Kaiha | Metallosilicate (transition metals) | — | Japan 196 719 |
| | Metallosilicates (pentaval. met.) | — | Japan 185 224 |
| | Bismuth silicate | — | Japan 195 185 |
| | Metallosilicates (Zr, Cs, B, Y, Ga) | — | Japan 185 225 |
| Snamprogetti | Borosilicate (Boralite A) | Nu-1 | Japan 22 638 |
| | Borosilicate (Boralite B) | Beta | Japan 22 638 |
| | Borosilicate (Boralite C) | ZSM-5 | Japan 22 638 |
| | Borosilicate (Boralite D) | ZSM-11 | Japan 22 638 |
| | Borosilicate (Boralite E) | — | Germany 3 316 488 |
| | Titanosilicate (TS-1) | ZSM-5 | U.S. Pat. No. 4,410,501 |
| | Metallosilicate (V, Be, Zn, Ti) | ZSM-5 | |
| | | ZSM-11 | Belgium 877 205 |
| Union | Molybdosilicate | — | U.S. Pat. No. 4,388,224 |

*Agency of industrial Science and Technology.
**Center for industrail Research of Quebec.

Szostak, supra, pages 51 to 132 inclusive, which is incorporated herein by reference, describes in great detail the hydrothermal process for making ZMS, and at pages 205 to 281 inclusive, which is also incorporated herein by reference, describes in great detail the hydrothermal processes for making the various NZMS's. The process of this invention, which makes new ZMS and NZMS structures, draws upon those descriptions developed in the prior art, but distinguishes from the prior art in the manner by which the hydrothermal process is carried out. The fundamental difference from the prior art is that the process of this invention limits the hydrothermal reaction conditions within the cation oxide amorphous framework-structure so that the process is dry, as characterized above. This means that the various conditions used in the prior art can be employed in the practice of this invention with the modification that the reaction be controlled to operate as a dry reaction. This also means that the rate at which water is incorporated in making the molecular sieve is controlled to assure that dry conditions prevail. In some cases, water is incrementally fed with or without other nutrients to the amorphous framework-structure, and/or water with or without other nutrients is provided to the amorphous framework-structure, to a state of incipient wetness, and after digestion, more water is similarly added. In this way the degree of conversion of the amorphous framework-structure to molecular sieve is readily controllable. Surprisingly, such procedures result in faster reactions and quicker conversion of amorphous framework-structures to molecular sieve. In some reactions, a limited amount of routine experimentation such as reordering addition of nutrients and temperature condition for crystal growth will be necessary to make a selected ZMS or NZMS. However, such experimentation will not be undue making the objectives of this invention inoperative with respect to any molecular sieve structure already known in the art. In addition, the process of this invention creates the potential for the development of novel molecular sieves.

In the following examples, the conversion levels of the products were measured by x-ray powder diffraction pattern ("XRD"). The crystallinity of the product was compared to the crystallinity of a reference sample by calculating the ratio of the peak areas (A): crystallinity=$A_{sample}/A_{reference}$. For zeolite beta, the ratio of the peak areas at $2\theta=22.40°$ was used. The reference H-beta sample was obtained from UOP. For ZSM-5 and silicalite-1 the crystallinity was calculated by the ratio between the sum of the peaks between $2\theta=23°$ and $25°$. The reference Na-ZSM-5 sample was obtained from UOP. For zeolite Y the crystallinity was calculated by the ratio of the peaks areas at 23.6, 26.9 and 31.30°. The reference NaY sample was obtained from Akzo. All samples were washed with an excess of water on a filter, and dried in air at 120° C. before measurement of the X-ray spectrum.

EXAMPLE 1

Conversion to zeolite beta Davison® Sylopol® 948 silica gel 50 μm spheres (486 grams) were fully impregnated to the incipient wetness point by an aqueous $Al(N_3O)_3$ solution (made with 202 grams of $Al(NO_3)_3 \cdot 9H_2O$ (Merck) dissolved in 800 grams of water), over a one-hour period, then dried in air at 120° C. to a constant weight. After drying, the dried impregnated silica spheres were calcined at 500° C. for 2 hours, resulting in a 5.35 weight % $Al_2O_3$ content and a Si/Al ratio of 15.

These spheres (1.10 grams) were mixed with 1.10 grams of an aqueous 35 weight % tetraethylammonium hydroxide (Aldrich) solution and 0.57 gram of an aqueous 3.68 weight % $NANO_3$ solution, corresponding to a molar oxide ratio of:

13.3 $SiO_2$:0.44 $Al_2O_3$:1 $TEA_2O$:0.1$Na_2O$: 55 $H_2O$

The mixture was placed in a 35 ml autoclave with a 4 ml Teflon® insert and heated at 155° C. for 44 hours. The product, which contained crystallite clusters of approximately 250 nm and large pores between these clusters, consisted of 50 μm particles with a framework-structure, as determined by scanning electron microscopic analysis, similar to the original Davison® Sylopol® 948 silica gel 50 μm spheres. The crystallinity of the zeolite beta product was 78%.

EXAMPLE 2

Conversion to zeolite beta Shell® (S 980 A 3.0) 3.0 mm silica spheres (3.09 grams) were fully impregnated to incipient wetness by a mixture of 1.25 grams of $Al(NO_3)_3 \cdot 9H_2O$ dissolved in 6.00 grams of water to obtain a Si/Al ratio of 15 in the impregnated product. The impregnated product was air dried at 120° C. to a constant weight. Two grams of these impregnated spheres were additionally impregnated with an aqueous 35 weight % tetraethylammonium hydroxide solution and 1.04 grams of an aqueous 3.68 weight % $NANO_3$ solution, giving a molar oxide ratio of

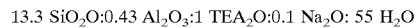
13.3 $SiO_2$:0.43 $Al_2O_3$:1 $TEA_2O$:0.1 $Na_2O$: 55 $H_2O$

The mixture was placed in a 30 ml stainless steel autoclave with a 25 ml Teflon® insert. After heating for 44 hours at 155° C., the product possessed 82% zeolite beta crystals and the morphology of the Shell 3.0 mm silica spheres.

EXAMPLE 3

Conversion to zeolite beta Davison® Sylopol® 948 silica gel 50 μm spheres were air-milled to a particle size of 3–5 μm. Then 3.10 grams of the milled particles were fully impregnated to incipient wetness by a mixture of 1.25 grams of $Al(NO_3)_3$ and 10.0 grams of water to result in a Si/Al ratio of 15, and then dried in air at 120° C. to a constant weight. Two and one-half grams of the milled and impregnated particles were impregnated with 2.50 grams of an 35 weight % aqueous tetraethylammonium hydroxide solution and 1.25 grams of an 3.68 weight % aqueous $NaNO_3$ solution, resulting in a molar oxide ratio of

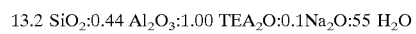
13.2 $SiO_2$:0.44 $Al_2O_3$:1.00 $TEA_2O$:0.1$Na_2O$:55 $H_2O$

The mixture was placed in a 35 ml stainless steel autoclave with a 10 ml Teflon® insert. After 46 hours at 155° C., the powder had been converted to 47 weight % zeolite beta. After ultrasonic treatment for 3 hours, the individual particle size of 3–5 μm was regained. The average crystallite size, according to TEM analysis (transmission electron microscopy), was 75–100 =m. The individual crystallites had a more ordered stacking than the reference zeolite beta powder.

EXAMPLE 4

Conversion to zeolite beta As described in Example 1 above, 3.10 grams of Davison® Sylopol® 948 silica gel 50 μm spheres were fully impregnated to incipient wetness by a solution made from 1.26 grams of $Al(NO_3)_3 \cdot 9H_2O$ and 8.60 grams of water, dried in air at 120° C. and calcined at 400° C. for 3 hours, cooled to room temperature and calcined at 800° C. for 3 hours, resulting in 5.35 weight % $Al_2O$, content (Si/Al ratio is 15).

Two and one-half grams (2.50 grams) of these spheres were impregnated with 2.50 grams of an aqueous 35 weight % tetraethylammonium hydroxide solution and 1.25 grams of an aqueous 3.68 weight % $NaNO_3$ solution. The molar oxide ratio was:

13.2 $SiO_2$:0.44 $Al_2O_3$:1.00 $TEA_2O$: 0.10$Na_2O$:55 $H_2O$

The mixture was placed in a 35 ml stainless steel autoclave with a 10 ml Teflon® insert. After 44 hours at 160° C., the spheres were converted to 94 weight % zeolite beta According to SEM analysis, the original size and shape of the spheres were not affected by the hydrothermal processing. Large pores were present in the converted spheres and crystallite clusters of 0.20–0.25 μm were formed. Typical features observed by TEM are crystallite sizes of 50–100 mm and a more ordered stacking of crystallites than in the reference zeolite beta powder.

EXAMPLE 5

Conversion to zeolite beta As described in Example 1 above, Davison® Sylopol® 948 silica gel 50 μm spheres were impregnated with an aqueous Al(NO$_3$)$_3$.9H$_2$O solution, dried in air at 120° C. and calcined at 400° C. for 3 hours, cooled to room temperature, resulting in 5.35 weight % Al$_2$O$_3$ content (Si/Al ratio is 15).

Two and one-half grams (2.50 grams) of these spheres were impregnated with 1.65 grams of an aqueous 35 weight % tetraethylammonium hydroxide solution and 1.25 grams of an aqueous 3.68 weight % NANO$_3$ solution. The molar oxide ratio was:

20.1 SiO$_2$:0.66 Al$_2$O$_3$:1 TEA$_2$O:0.14 Na$_2$O:64.5 H$_2$O

The mixture was placed in a 35 ml stainless steel autoclave with a 10 ml Teflon® insert. After 120 hours at 160° C. the zeolite beta crystallinity of the product was 32.4%, as measured by XRD versus the reference sample, while maintaining according to light microscopy the sphere morphology of the Davison® Sylopol® 948 silica gel 50 μm spheres.

EXAMPLE 6

Conversion to ZSM-5 As described in Example 1 above, 3.10 grams of Davison® Sylopol® 948 silica gel 50 μm spheres were impregnated with a mixture of 0.63 gram Al(NO$_3$)$_3$.9H$_2$O and 11.5 grams of water to obtain a Si/Al ratio of 30, and dried in air at 120° C. to a constant weight. Two and one-half grams (2.50 grams) of these spheres were impregnated with 1.25 grams of an aqueous 35 weight % tetrapropylammonium hydroxide solution and 1.25 grams of an aqueous 3.68 weight % NaNO$_3$ solution, giving a molar oxide ratio of:

33.6 SiO$_2$:0.56 Al$_2$O$_3$:1 TPA$_2$O:0.22 Na$_2$O:108 H$_2$O

The mixture was placed in a 35 ml stainless steel autoclave with a 10 ml Teflon® insert. After 25 hours at 158° C. the ZSM-5 crystallinity of the product was 25.1% as measured by XRD versus the reference sample. The particle shape and size of the parent amorphous framework-structure spheres were retained in the product. Large pores were formed in the product spheres upon conversion to ZSM-5. According to SEM analysis, the product spheres contained cubic crystals sized between 0.5 μm and 1.5 μm.

EXAMPLE 7

Conversion to ZSM-5 Shell® (S 980 A 3.0) 3.0 mm silica spheres (6.20 grams) were fully impregnated to incipient wetness by a mixture of 1.26 grams of Al(NO$_3$)$_3$.9H$_2$O dissolved in 12.08 grams of water to obtain a Si/Al ratio of 30 in the impregnated product. The impregnated product was air dried at 120° C. to a constant weight. Two and one-half grams (2.50 g) of these spheres were impregnated with 1.25 g of an aqueous 40 weight % tetrapropylammonium hydroxide solution and 0.55 g of an aqueous 3.68 weight % NANO$_3$ solution, corresponding to the following molar oxide ratio:

33.6 SiO$_2$:0.56 Al$_2$O$_3$:1 TPA$_2$O:0.1 Na$_2$O: 60 H$_2$O

The mixture was placed in a 35 ml stainless steel autoclave with 10 ml Teflon® insert. After 18 hours at 155° C. the S 980 spheres were partially converted to ZSM-5 (10% crystallinity), while retaining the original S 980 sphere morphology.

EXAMPLE 8

Conversion to Silicalite-1 In this example, 1.10 g of Davison® Sylopol® 948 silica gel 50 μm spheres were fully impregnated to incipient wetness by mixing with 0.55 g of an aqueous 40 weight % tetrapropylammonium hydroxide solution and 0.55 g of an aqueous 3.68 weight % NaNO$_3$ solution, giving the following molar oxide ratio:

33.7 SiO$_2$:1.00 TPA$_2$O:0.22 Na$_2$O:92.4 H$_2$O

The mixture was placed in a 35 ml stainless steel autoclave with 4 ml Teflon® insert. After 23 h at 165° C. the impregnated spheres were partially converted to silicalite-1 (crystallinity 11%). By light microscopy it was observed that the particle size and shape of the precursor material was maintained.

EXAMPLE 9

Conversion to zeolite Y In this example, 495 grams of Davison® Sylopol® 948 silica gel 50 μm spheres were filly impregnated to incipient wetness by a mite of 294 grams of Al(NO$_3$)$_3$ and 770 grams of water, dried in air at 120° C. to a constant weight, and calcined in at 500° C. for 2 hours. The resulting Al$_2$O$_3$ content was 7.50 wt %. Ten grams of these spheres were impregnated with 24.30 grams of a mixture of 13.44 grams of Al(NO$_3$)$_3$.9H$_2$O and 35.3 of water to obtain a Si/Al ratio of 4.75, dried in air at 120° C. to a constant weight and calcined at 300° C. for 6 hours. Finally the spheres were fully impregnated with 24.44 grams of the above mentioned Al(NO$_3$)$_3$ solution to obtain a Si/Al ratio of 3, dried in air at 120° C. to a constant weight and calcined at 300° C. for 6 hours. Two grams of these spheres were impregnated with 3.50 g of an aqueous 20% NaOH solution. The resulting molar oxide ratio was:

2.94 SiO$_2$:0.49 Al$_2$O$_3$:1.00 Na$_2$O:17.8 H$_2$O

The impregnated spheres were heated at 100° C. in a 50 ml polypropylene bottle. After 16 hours, the crystallinity of the product was 102% zeolite Y in the form of crystallite clusters of 1.5–2.0 μm in size. By TEM it was found that these crystallite clusters consisted of ordered 50–100 nm crystals. According to SEM analysis, the product's shape and size was that of the parent particles with large pores within the sphere structure.

EXAMPLE 10

Conversion to zeolite Y Davison® Sylopol® 948 silica gel 50 μm spheres (486 grains) were fully impregnated to incipient wetness with an aqueous Al(NO$_3$)$_3$ solution (made with 202 grams of Al(NO$_3$)$_3$.9H$_2$O dissolved in 800 grams of water), then dried in air at 120° C. to a constant weight. After drying, the dried impregnated silica spheres were calcined at 500° C. for 2 hours, resulting in a 5.35 weight % Al$_2$O$_3$ content and a Si/Al ratio of 15. The spheres were jet milled to a particle size of 3–5 μm. Of these particles 10.03 grams were fully impregnated to incipient wetness by 25.42 grams of a mixture of 15.84 grams of Al(NO$_3$)$_3$.9H$_2$O and 35.0 g of water to obtain a Si/Al ratio of 5.0, dried in air at 120° C. to a constant weight, and calcined at 300° C. for 6 hours. The particles were then impregnated with 25.42 grams of the above-mentioned Al(NO$_3$)$_3$ solution to obtain a Si/Al ratio of 3, dried in air at 120° C. to a constant weight, and calcined at 300° C. for 6 hours. Of these particles, 2.00 grams were fully impregnated to incipient wetness by 4.00 grams of an aqueous 20% NaOH solution. The resulting molar oxide ratio was:

2.58 SiO$_2$:0.43 Al$_2$O$_3$:1.00 Na$_2$O:17.8 H$_2$O

The mixture was heated at 100° C. in a 100 ml polypropylene bottle. After 22 hours the crystallinity of the product was 86% zeolite Y. After ultrasonic treatment for 3 hours, particle size measurements indicated a typical particle size equal to that of the parent material.

What is claimed is:

1. A process for producing a molecular sieve, comprising:
   impregnating a previously produced dried cation oxide framework with a liquid, said liquid containing a pore-forming agent, said liquid being added in an amount that does not exceed the incipient wetness point of the framework, said cation oxide framework comprising a member selected from the group consisting of:
   (a) silicon and at least one member selected from the group consisting of beryllium, magnesium, zinc, cobalt, iron, manganese, boron, gallium, chromium, germanium, phosphorus, vanadium, zirconium, tungsten, arsenic, and niobium, and
   (b) aluminum and phosphorus; and
   heating the impregnated cation oxide framework to produce a large pore composite porosity molecular sieve.

2. The process of claim 1 wherein the molecular sieve retains the structure of the cation oxide framework.

3. The process of claim 1 wherein the framework that is impregnated is a calcined amorphous framework.

4. The process of claim 3 wherein said calcination was effected at a temperature of from about 300° C. to about 700° C.

5. The process of claim 4 wherein the crystalline content of the molecular sieve is at least 25 weight %.

6. The process of claim 5 wherein the pore-forming agent is a quaternary ammonium compound.

7. The process of claim 1 wherein the cation oxide framework is comprised of silicon, aluminum and phosphorus.

8. The process of claim 1 wherein the cationic framework is comprised of aluminum and phosphorus.

* * * * *